(12) United States Patent
Okuda et al.

(10) Patent No.: US 7,133,346 B2
(45) Date of Patent: Nov. 7, 2006

(54) PHOTO-DETECTOR AMPLIFIER CIRCUIT FOR OPTICAL DISK DEVICE

(75) Inventors: Takanori Okuda, Kashiba (JP); Takashi Yokoyama, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 442 days.

(21) Appl. No.: 10/294,573

(22) Filed: Nov. 15, 2002

(65) Prior Publication Data
US 2003/0112727 A1 Jun. 19, 2003

(30) Foreign Application Priority Data
Dec. 14, 2001 (JP) ............... 2001-382104

(51) Int. Cl.
*G11B 7/00* (2006.01)
*H01L 31/00* (2006.01)

(52) U.S. Cl. ............... 369/53.27; 369/124.11; 250/214 AG

(58) Field of Classification Search ............... 369/53.2, 369/53.37, 124.11; 250/214 AG; *H01L 31/00; G11B 7/00*
See application file for complete search history.

(56) References Cited

U.S. PATENT DOCUMENTS

| | | | | |
|---|---|---|---|---|
| 5,091,806 | A * | 2/1992 | Maeda et al. | 360/67 |
| 5,287,340 | A * | 2/1994 | Chapman et al. | 369/44.41 |
| 5,483,200 | A * | 1/1996 | Okabayashi et al. | 330/308 |
| 5,808,296 | A * | 9/1998 | McMonagle et al. | 250/221 |
| 6,026,065 | A * | 2/2000 | Kim et al. | 369/44.27 |
| 6,184,752 | B1 * | 2/2001 | Dautriche | 330/278 |
| 6,477,131 | B1 * | 11/2002 | Tsuchinaga et al. | 369/124.12 |
| 6,597,643 | B1 * | 7/2003 | Mitchell et al. | 369/44.27 |
| 6,608,524 | B1 * | 8/2003 | Kawabe et al. | 330/137 |
| 6,762,647 | B1 * | 7/2004 | Apel | 330/279 |

FOREIGN PATENT DOCUMENTS

| | | |
|---|---|---|
| JP | 61-180935 | 8/1986 |
| JP | 64-066830 | 3/1989 |
| JP | 03-104030 | 5/1991 |
| JP | 04-123320 | 4/1992 |
| JP | 6-96449 A | 4/1994 |
| JP | 08-315369 | 11/1996 |
| JP | 10-255301 A | 9/1998 |
| JP | 11-73677 A | 3/1999 |
| JP | 11-134652 | 5/1999 |

OTHER PUBLICATIONS

MAT (machine assisted translation) of JP 10-255301.*
MAT (machine assisted translation) of JP 06-096449.*
Chinese Office Action and partial English translation thereof mailed Jun, 25, 2004 in corresponding Chinese application No. 02156306.3.

* cited by examiner

*Primary Examiner*—A M Psitos
(74) *Attorney, Agent, or Firm*—Nixon & Vanderhye P.C.

(57) ABSTRACT

A two-stage amplifier of a first-stage amplifier 21 and second-stage amplifiers 22 and 23 is provided. A writing mode and reproducing modes are switched in the first-stage amplifier 21 by switching a parallel circuit of a feedback capacitor Cf1w and a feedback resistor Rf1w and a parallel circuit of a feedback capacitor Cf1r and a feedback resistor Rf1r. The second-stage amplifier 23 is provided with feedback resistors Rf22 and Rf23 that are connected to each other in parallel. The feedback resistor Rf23 is connected in the feedback loop by a switch transistor QSW only when reproducing a high-reflective disk. This enables an amplifier gain to be suitably set for each of writing, low-reflective disk reproducing, and high-reflective disk reproducing. As a result, desirable reproducing characteristics can be obtained for the low-reflective disk while accommodating high-speed writing with a large laser power.

4 Claims, 12 Drawing Sheets

PHOTO-DETECTOR AMPLIFIER CIRCUIT FOR OPTICAL DISK DEVICE

FIELD OF THE INVENTION

The present invention relates to photo-receptor amplifier circuits for use in optical disk recording and reproducing devices.

BACKGROUND OF THE INVENTION

In addition to conventional read-only optical disks such as CD-ROM, CD-R, and DVD-ROM, there has been increasing demand in recent years for writable optical disks, such as CD-R/RW and DVD-RAM, which are primarily used as personal computer appliances. In a recording and reproducing device of such writable optical disks, the quantity of irradiated light is much larger in writing than in reproducing, and accordingly a photo-detector amplifier circuit, which receives reflected light off the optical disk, has a large light input. In order to accommodate a difference in light input level between writing and reproducing, the photo-detector amplifier circuit adopts a system in which gains are switched between writing and reproducing.

FIG. 10 is a block diagram showing an electrical structure of a common recording and reproducing device 1. A signal from a signal source 2 enters an LD driving circuit 3 that is provided with a semiconductor laser. A beam splitter 4 splits an optical signal from the semiconductor laser for entry into a photo-detector element A2 and an optical disk 5. The light that was projected on the optical disk 5 and reflected off the disk surface enters the photo-detector element A1 via the beam splitter 4 and is converted and amplified into an electrical signal before it is supplied to a second-stage circuit where signal reproduction is carried out. The photo-detector element A1 also outputs a signal that enters a laser power control circuit 6 with an output signal from a photo-detector element A2, so as to adjust output laser power.

FIG. 11 is a block diagram showing an electrical structure of a photo-detector amplifier circuit 10 of a typical conventional example in the recording and reproducing device 1, in which gains are switched between writing and reproducing. The photo-detector element A1 is made up of a photodiode pd that is divided into four channel areas A through D. The photo-detector amplifier circuit 10 includes a first-stage amplifier 11 and a second-stage amplifier 12 that are individually provided for the channels A through D, and a second-stage amplifier 13 that is commonly provided for the channels A through D. The optical signal of the reflected light from the optical disk 5 is converted into a current signal isc in the photodiode pd. The current signal isc is subjected to current-voltage conversion and amplified in an amplifier a11.

The output of the amplifier a11 of the first-stage amplifier 11 of each channel A to D is supplied to a non-inverted terminal of a differential amplifier a21 of the corresponding second-stage amplifier 12 and to a non-inverted terminal of a differential amplifier a22 of the common second-stage amplifier 13 that is provided for collection (addition) (described later). In the differential amplifiers a21 and a22, the input is compared with their respective reference voltages before it is amplified and outputted. The output signal of the differential amplifier a21 is used for focusing and tracking servo of the optical system. The output signal of the differential amplifier a22 is used to read out signal information written in the disk.

Switching gains between writing and reproducing is carried out by the amplifier a11. For example, the current signal isc is converted into a voltage and amplified with a resistance value of a feedback resistor rf1r in reproducing. On the other hand, in writing, the current signal isc is converted into a voltage and amplified with a parallel resistance value of a feedback resistor rf1w and the feedback resistor rf1r, which are connected parallel to each other in response to closing of a switch sw1. The feedback resistors rf1r and rf1w, which are provided to set gains, are adjusted to have resistance values that do not cause the amplifier a11 to be saturated in response to expected incident light power. The gain of the differential amplifier a21 is adjusted by an input resistor rs1 and a feedback resistor rf1 by their ratio rf1/rs1. The gain of the differential amplifier a22 is adjusted by an input resistor rs2 and a feedback resistor rf2 by their ratio rf2/rs2.

The first-stage amplifier 11 further includes a dummy amplifier a12, and feedback resistors rf2r and rf2w for the dummy amplifier a12. In addition, there is also provided a switch sw2, which closes with the switch sw1 in writing to connect the feedback resistor rf2w with the feedback resistor rf2r in parallel. The output of the dummy amplifier a12 is commonly supplied to inverted terminals of the differential amplifiers a21 and a22 of the second-stage amplifiers 12 and 13, respectively, so as to create their respective reference voltages.

This structure of the dummy amplifier a12 is needed when the amplifier a11 is a grounded amplifier and when it is connected to the differential amplifiers a21 and a22 of their respective second-stage amplifiers 12 and 13, which use the externally supplied reference power as reference voltages, because the reference voltages are determined by the internal amplifier structure in this case.

FIG. 12(a) through FIG. 12(d) are waveform diagrams explaining operations of the photo-detector amplifier circuit 11 having foregoing structure. An input optical signal shown in FIG. 12(a) is converted in the photodiode pd into the current signal isc shown in FIG. 12(b). The amplifier a11 outputs a signal that was created by current-voltage conversion of the signal shown in FIG. 12(c). FIG. 12(d) shows an output waveform that is created in the differential amplifier a21 by amplifying the result of comparison between the output of the amplifier a11 and an externally supplied reference voltage. The output waveform shown in FIG. 12(d) is also obtained, for example, when the outputs of the amplifiers a11 of the channel A through D are added and amplified in the differential amplifier a22. Note that, in FIG. 12(a) through FIG. 12(d), the broken lines with reference sign r indicate waveforms of reproducing, and solid lines with reference sign w indicate waveforms of writing.

In the recording and reproducing device 1, an optical system, including the beam splitter 4, is designed and fixed, taking into account the light of laser output (a quantity of light reflected into the photo-detector element A1) in writing and characteristics (sensitivity and/or dynamic range) of the photo-detector element A1. That is, a quantity of reflected light is adjusted so as not to cause the amplifier of the photo-detector element A1 to be saturated in response to a large quantity of light in writing. In addition to the adjustment in writing, the foregoing optical design also adjusts a quantity of reflected light in reproducing. This increases the speed of writing and, with increasing laser power, reduces the optical signal that enters the photo-detector element A1 in reproducing.

In this way, the photo-detector amplifier circuit 11 switches gains in response to a large light quantity in writing, so as to prevent the differential amplifier a11 from being saturated. However, with increasing laser power in response to a faster writing speed, gains tend to decrease both in writing and reproducing.

Read-only CD-ROM, writable CD-R, and rewritable CD-R/RW are some of the examples of the CD disk media that employs the laser light with a wavelength of 780 nm. Read-only DVD-ROM, writable DVD-R and DVD-RAM, and rewritable DVD-R/RW are some of the examples of DVD disk media that uses the laser light with a wavelength of 650 nm. Different disk types have different reflectances and the quantity of reflected laser light from the disk varies between these different types of disks. Generally, the rewritable CD-R/RW and DVD-R/RW disks have reflectances that are smaller by several factors than those of the read-only ROM disks.

The faster writing speed and diversification of the disk media have created a situation where the photo-detector amplifier circuit 11 receives a small optical signal when reproducing a low-reflective disk and there is a difficulty in reproducing signals from low-reflective disks.

SUMMARY OF THE INVENTION

It is accordingly an object of the present invention to provide a photo-detector amplifier circuit, for use in an optical disk device, that can obtain desirable reproducing characteristics for low-reflective disks while accommodating high-speed writing with a large laser power.

In order to achieve this object, the present invention provides a photo-detector amplifier circuit for an optical disk device, the photo-detector amplifier circuit being a photo-detector amplifier circuit in a device that reproduces and records information on and from an optical disk, the photo-detector amplifier circuit including: a gain setting section for suitably setting an amplifier gain for each of a writing mode, a low-reflective disk reproducing mode, and a high-reflective disk reproducing mode.

According to this configuration, because gains are switched in three values (modes), including a single writing mode and two reproducing modes, an amplifier gain can be suitably set for each of writing, low-reflective disk reproducing, and high-reflective disk reproducing.

As a result, desirable reproducing characteristics can be obtained for low-reflective disks while accommodating high-speed writing with a large laser power.

For a fuller understanding of the nature and advantages of the invention, reference should be made to the ensuing detailed description taken in conjunction with the accompanying drawings.

DESCRIPTION OF THE EMBODIMENTS

One embodiment of the present invention is described below with reference to FIG. 1 through FIG. 6.

Figure 1:
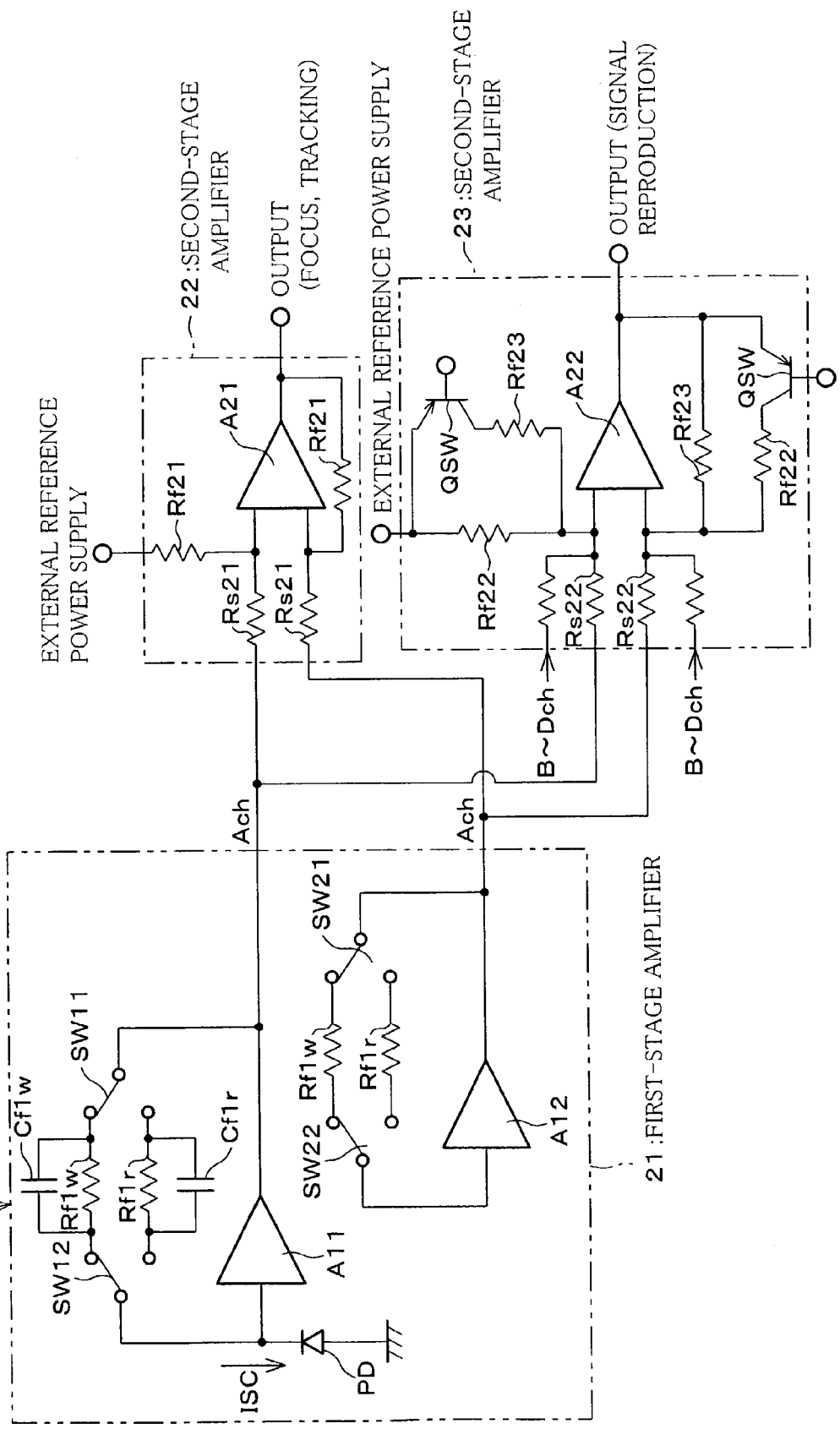
FIG. 1 is a block diagram showing an electrical structure of a photo-detector amplifier circuit of one embodiment of the present invention.

FIG. 1 is a block diagram showing an electrical structure of a photo-detector amplifier circuit 20 of one embodiment of the present invention. A photo-detector amplifier circuit 20 includes a first-stage amplifier 21 and a second-stage amplifier 22, which are provided for each channel A to D, and a second-stage amplifier 23, which is commonly provided for all channels A to D. An optical signal of reflected light from an optical disk is converted into a current signal Isc through a photodiode PD. The current signal Isc is then subjected to current-voltage conversion and amplified in an amplifier A11.

The output of the amplifier A11 of the first-stage amplifier 21 of each channel A to D is supplied to a non-inverted terminal of a differential amplifier A21 of the corresponding second-stage amplifier 22 and to a non-inverted terminal of a differential amplifier A22 of the common second-stage amplifier 23 that is provided for collection (addition). In the differential amplifiers A21 and A22, the input is compared with their respective reference voltages before it is amplified and outputted. The output signal of the differential amplifier A21 is used for focusing and tracking servo of the optical system. The output signal of the differential amplifier A22 is used to read out signal information written in the disk.

What is significant about the photo-detector amplifier circuit 20 is that the gain of the first-stage amplifier 21 and the gain of the second-stage amplifier 23 are both switchable. Therefore, for the amplifier A11, the first-stage amplifier 21 is provided with a feedback loop for writing, which is made up of a parallel circuit with a feedback resistor Rf1W and a feedback capacitor Cf1w, and a feedback loop for reproducing, which is made up of a parallel circuit with a feedback resistor Rf1r and a feedback capacitor Cf1r. These two feedback loops are selectively used by being switched with a pair of switches SW11 and SW12.

The first-stage amplifier 21 further includes a dummy amplifier A12 and its feedback loops Rf1w and Rf1r. The first-stage amplifier 21 is also provided with switches SW21 and SW22, which operate with the switches SW11 and SW12 to select the feedback resistor Rf1w when writing and the feedback resistor Rf1r when reproducing. The output of the dummy amplifier A12 is commonly supplied to inverted terminals of the differential amplifiers A21 and A22 of their respective second-stage amplifiers 22 and 23, so as to create their reference voltages.

For the differential amplifier A22, the second-stage amplifier 23 is provided with two input resistors Rs22, which are respectively provided on the both input sides of the differential amplifier A22. The second-stage amplifier 23 also includes parallel feedback resistors Rf22 and Rf23, which correspond to each input side of the differential amplifier A22. The feedback resistors Rf22 are connected all the time in the feedback loops, whereas the feedback resistors Rf23 become connected in the feedback loops by serially provided switch transistors QSW, only when reproducing a high-reflective disk.

The feedback resistors Rf1w and Rf1r, which adjust gains, are adjusted to have such resistance values that the amplifier A11 is not saturated in response to expected incident light power of writing and reproducing. Generally, the feedback resistor Rf1w has a smaller resistance value than the feedback resistor Rf1r by several factors.

The gain of the differential amplifier A22 is determined by the input resistors Rs22 and the feedback resistors Rf22 and Rf23 by a ratio Rf2/Rs22. Rf2 has a value of the feedback resistor Rf22 alone when reproducing a low-reflective disk, whereas Rf2 takes the value of the parallel resistance of the feedback resistors Rf22 and Rf23 when reproducing a high-reflective disk. That is, the differential amplifier A22 has a high gain when reproducing a low-reflective disk and has a low gain when reproducing a high-reflective disk.

It is preferable that the ratio of resistance value of the high-gain feedback resistor Rf22 alone to parallel resistance value of the low-gain feedback resistors Rf22 and Rf23 is adjusted to a value substantially two times the reflectance ratio of a low-reflective disk, such as a CD-R/RW, to a high-reflective disk, such as a CD-ROM. Here, the adjusted value must not cause the differential amplifier A22 to be saturated, so that no distortion generates on the output waveform.

On the other hand, for the differential amplifier A21, the second-stage amplifier 22 is provided with two input resistors Rs21, which are provided on the both input sides of the differential amplifier A21. The second-stage amplifier 22 further includes a feedback resistor Rf21, which corresponds to each input side of the differential amplifier A21. The gain of the differential amplifier A21 is fixed at a ratio Rf21/Rs21.

By thus switching gains of the amplifiers A21 and A22 with three values (in three modes: one writing mode and two reproducing modes), an amplifier gain can be suitably set for writing and low-reflective disk reproducing and high-reflective disk reproducing. It is therefore possible to obtain desirable reproducing characteristics for low-reflective disks, while accommodating high-speed writing with a large laser power.

Here, the second-stage amplifier 23 does not employ the gain switching method of the first-stage amplifier 21 because the frequency characteristics of the second-stage amplifier 23 as a photo-detector amplifier circuit are heavily dependent on the frequency characteristics of the first-stage amplifier 21 and accordingly the influence of the differential amplifier A22, which carries out voltage amplification of the second-stage, is small. The switching method of the second-stage amplifier 23 only requires addition of the feedback resistors Rf22 and the switch transistors QSW and thereby requires smaller chip area and lower manufacturing cost.

Figure 2:
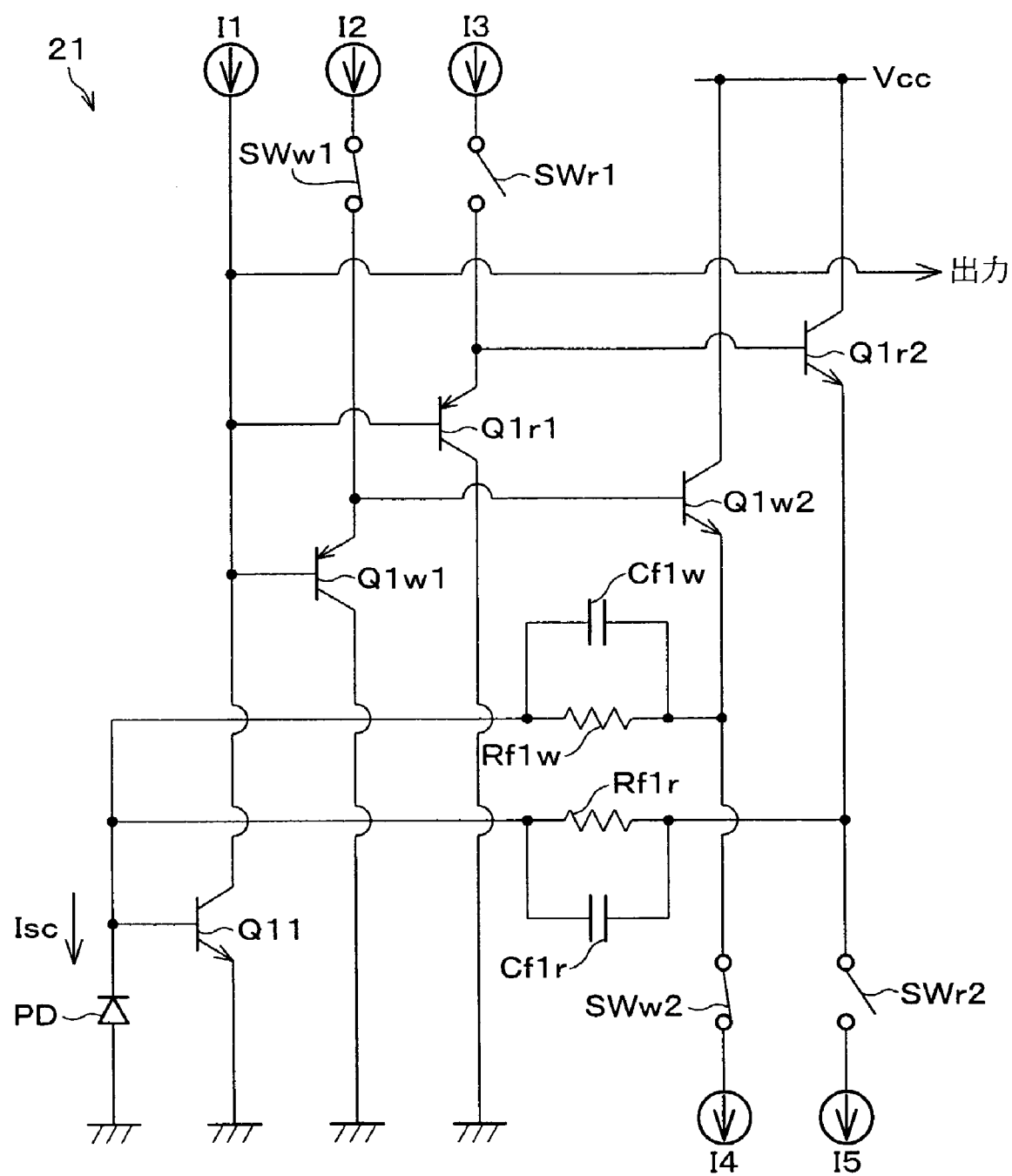
FIG. 2 is an electrical circuit diagram showing a specific structure of a first-stage amplifier in the photo-detector amplifier of FIG. 1.

FIG. 2 is an electrical diagram showing a specific structure of the first-stage amplifier 21. The first-stage amplifier 21 is a grounded amplifier and the photodiode PD is connected to a base of an N-type transistor Q11 that carries out amplification. To a collector of the transistor Q11 is supplied a constant current from a constant power supply I1, and the collector makes up an output terminal for the second-stage amplifiers 22 and 23.

The base of the transistor Q11 is connected to one terminal of the parallel circuit of the feedback resistor Rf1w and the feedback capacitor Cf1w and to one terminal of the parallel circuit of the feedback resistor Rf1r and the feedback capacitor Cf1r. The other terminals of these parallel circuits are respectively connected to emitters of N-type transistors Q1w2 and Q1r2. The collectors of the transistors Q1w2 and Q1r2 are connected to a high-level power supply. Constant current supplies I4 and I5 selectively draw constant currents from the emitters of the transistors Q1w2 and Q1r2 via switches SWw2 and SWr2.

The bases of the transistors Q1w2 and Q1r2 are connected to emitters of P-type transistors Q1w1 and Q1r1, respectively. The collectors of the P-type transistors Q1w1 and Q1r1 are grounded and the bases of these transistors are connected to the collector of the transistor Q11. To the emitters of the transistors Q1w1 and Q1r1 are selectively supplied constant currents from constant current supplies I2 and I3 via switches SWw1 and SWr1.

Thus, closing the switches SWw1 and SWw2 (state shown in FIG. 2) turns ON the transistors Q1w1 and Q1w2 by the currents from the constant current supplies I2 and I4. The transistors Q1w1 and Q1w2 in an ON state connect the parallel circuit of the feedback resistor Rf1w and the feedback capacitor Cf1w between the collector of the transistor Q11, which makes up an output terminal of the first-stage amplifier 21, and the base of the transistor Q11, which makes up an input terminal of the first-stage amplifier 21, and thereby forms a feedback loop for writing. Here, the switches SWr1 and SWr2 are open and the transistors Q1r1 and Q1r2 are OFF, and therefore the feedback circuit of the feedback resistor Rf1r and the feedback capacitor Cf1r is open.

Closing the switches SWr1 and SWr2 turns on the transistors Q1r1 and Q1r2 by the currents from the constant current supplies I3 and I5. The transistors Q1r1 and Q1r2 in an ON state connect the parallel circuit of the feedback resistor Rf1r and the feedback capacitor Cf1r between the collector and base of the transistor Q11 and thereby forms a feedback loop for reproducing. Here, the switches SWw1 and SWw2 are open and the transistors Q1w1 and Q1w2 are OFF, and therefore the feedback circuit of the feedback resistor Rf1w and the feedback capacitor Cf1w is open.

In this way, in writing and reproducing, only one pair of feedback loops is connected to the transistor Q11 that amplifies the current signal Isc, so as to eliminate influence of unnecessary elements. As a result, high-speed and wide-band operations can be realized. This is also advantageous in terms of designing because it conveniently improves design accuracy by enabling different time constants (Rf×Cf) to be set for writing and reproducing. Further, because the photodiode PD is biased with the base-emitter voltage VBE of the transistor Q11, a wide dynamic range of from about VBE (0.8 V) to about Vcc−VCE (4.7 V) can be obtained.

Figure 3:
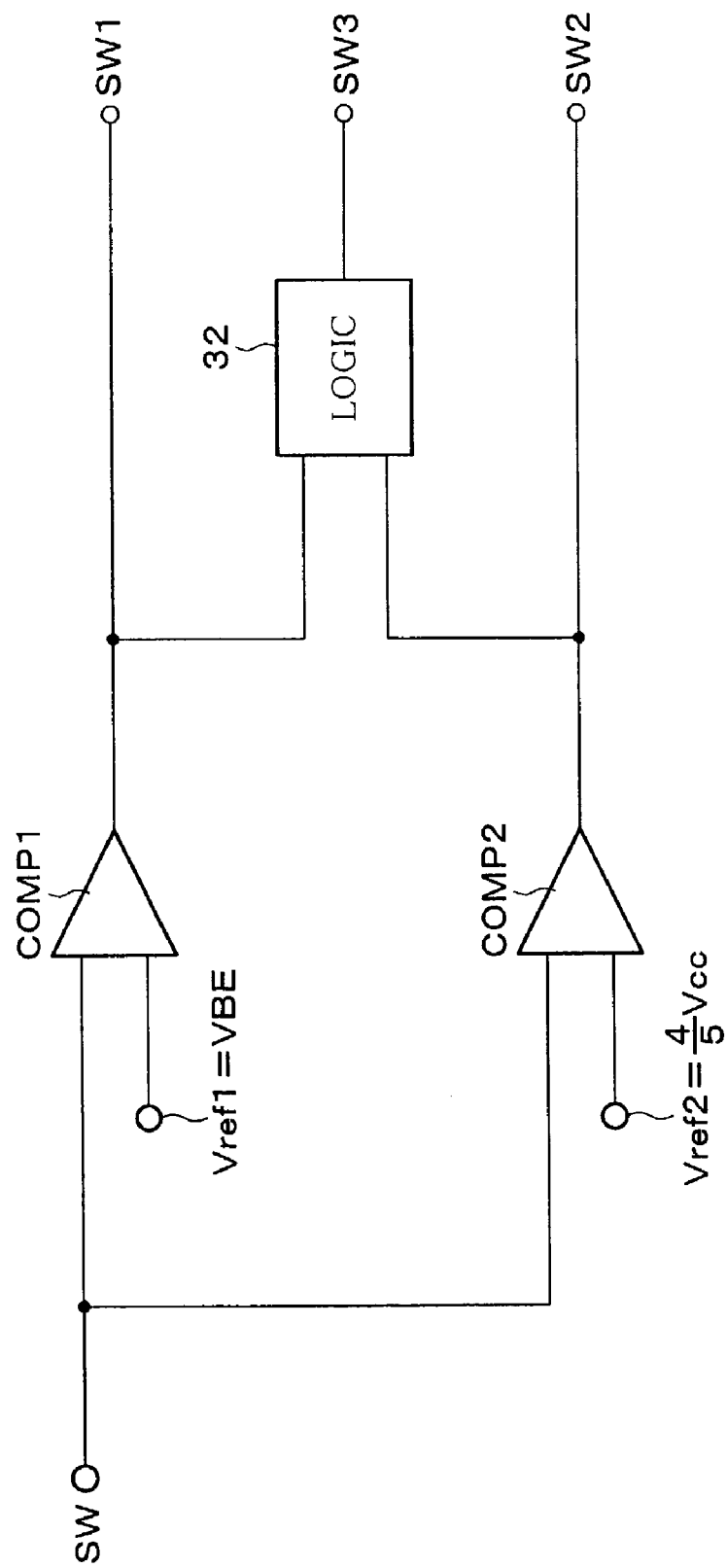
FIG. 3 is a block diagram showing a switching circuit that switches gains.

FIG. 3 is a block diagram showing a switching circuit 31 that switches to control the switches SWw1 and SWw2, the switches SWr1 and SWr2, and the transistors QSW. The switching circuit 31 includes one input terminal SW, two comparators COMP1 and COMP 2, and a logic circuit 32 that is realized by an AND circuit.

A switch control signal from the input terminal SW is commonly supplied to the comparators COMP 1 and COMP 2 through one of their input terminals. To the other terminal of the comparator COMP1 is supplied a first reference voltage Vref1. To the other terminal of the comparator COMP2 is supplied a second reference voltage Vref2.

The output SW1 of the comparator COMP1 becomes low level when the level of the switch control signal is lower than the reference voltage Vref1, and becomes high level when the level of the switch control signal is at or higher than the reference voltage Vref1. The output SW2 of the comparator COMP2 becomes low level when the level of the switch control signal is higher than the reference voltage Vref2, and becomes high level when the level of the switch control signal is at or lower than the reference voltage Vref2.

The output SW3 of the AND circuit 32 becomes high level only when the outputs SW1 and SW2 of the comparators COMP1 and COMP2 are both high level. The output SW3 of the AND circuit 32 is otherwise at low level.

The reference voltage Vref1 is, for example, 1VBE (=0.8 V), and the reference voltage Vref2 is, for example, 4·Vcc/5. The output SW1 is supplied to the switches SWr1 and SWr2 that switch the reproducing modes in the first-stage amplifier 21. The output SW2 is supplied to the switches SWw1 and SWw2 that switch the writing mode and the reproducing modes in the first-stage amplifier 21. The output SW3 is supplied to the switch transistors QSW of the second-stage amplifier 23.

Figure 4:
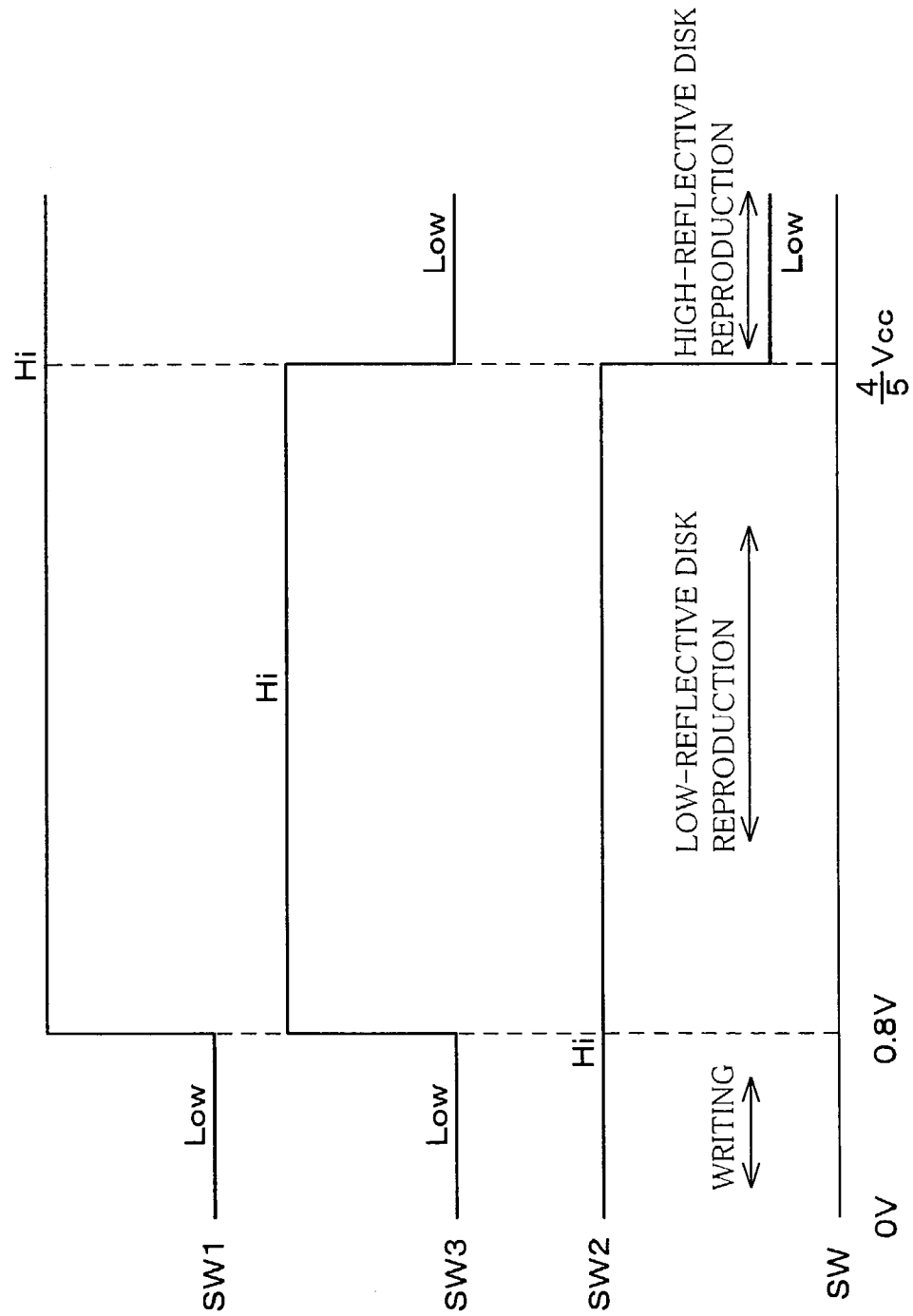
FIG. 4 is a waveform diagram explaining operations of the switching circuit.

Therefore, as shown in FIG. 4, the writing mode is selected when the switch control signal from the input terminal SW1 is below 0.8 V, and the low-reflective disk reproducing mode is selected when the switch control signal from the input terminal SW1 is between 0.8 V and 4·Vcc/5, inclusive, and the high-reflective disk reproducing mode is selected when the switch control signal from the input terminal SW1 is above 4·Vcc/5.

That is, only one input terminal SW is used to switch gains in three values (modes), thereby reducing the number of pins in the photo-detector amplifier circuit 20 and thereby suppressing device cost.

Figure 5:
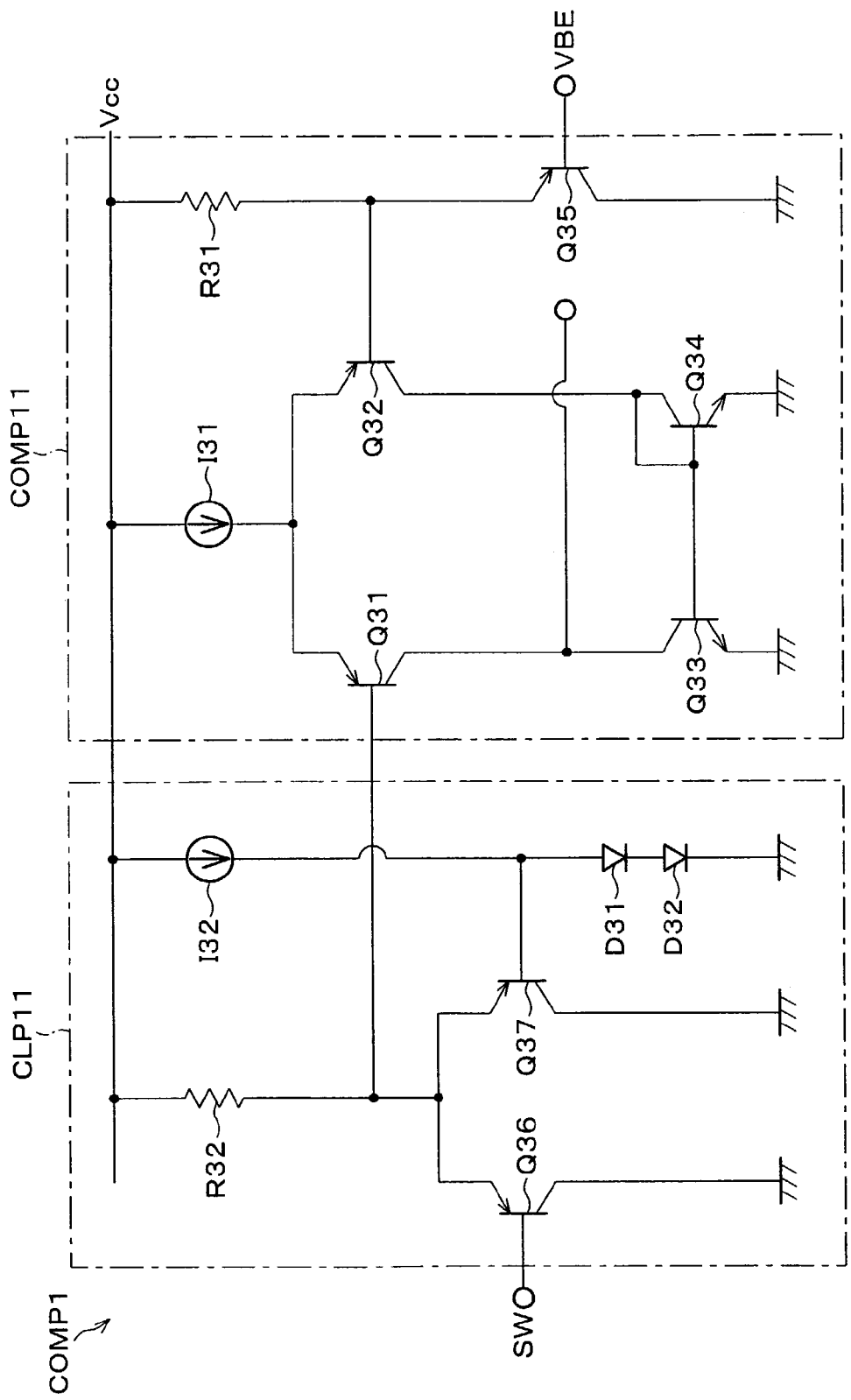
FIG. 5 is an electrical circuit diagram showing one example of a structure of a comparator in the switching circuit.

FIG. 5 is an electrical diagram showing one example of a structure of the comparator COMP1. The comparator COMP1 includes a comparator COMP11 and a clamping circuit CLP11, the comparator COMP11 being realized by transistors Q31 through Q35, a resistor R31, and a constant current supply I31, and the clamping circuit CLP11 being realized by transistors Q36 and Q37, diodes D31 and D32, a resistor R32, and a constant current supply I32.

The comparator COMP11 operates to compare base voltages of the transistors Q31 and Q32 that make up a differential pair. The base voltage of the transistor Q32, which becomes a threshold, is a voltage 2VBE, which is the sum of the reference voltage 1VBE given to the base of the transistor Q35, and the base-emitter voltage of the transistor Q35. On the other hand, the base voltage of the transistor Q31, which is supplied for comparison, is the sum of the switch control signal from the input terminal SW and the base-emitter voltage of the transistor Q36. Hence, the threshold voltage of the comparator COMP11 with respect to the input terminal SW becomes a reference voltage VBE.

Here, the base voltage of the transistor Q31, which is the input of the comparator COMP11, is limited by the transistor Q37 below a voltage 3VBE (2.4 V), which is set by the transistor Q37 and the diodes D31 and D32. This prevents the comparator COMP11 from being saturated in response to a large voltage increase of the switch control signal that is supplied to the base of the transistor Q36, thereby suppressing adverse effects of saturation, such as malfunctions and/or deterioration of response characteristics.

Figure 6:
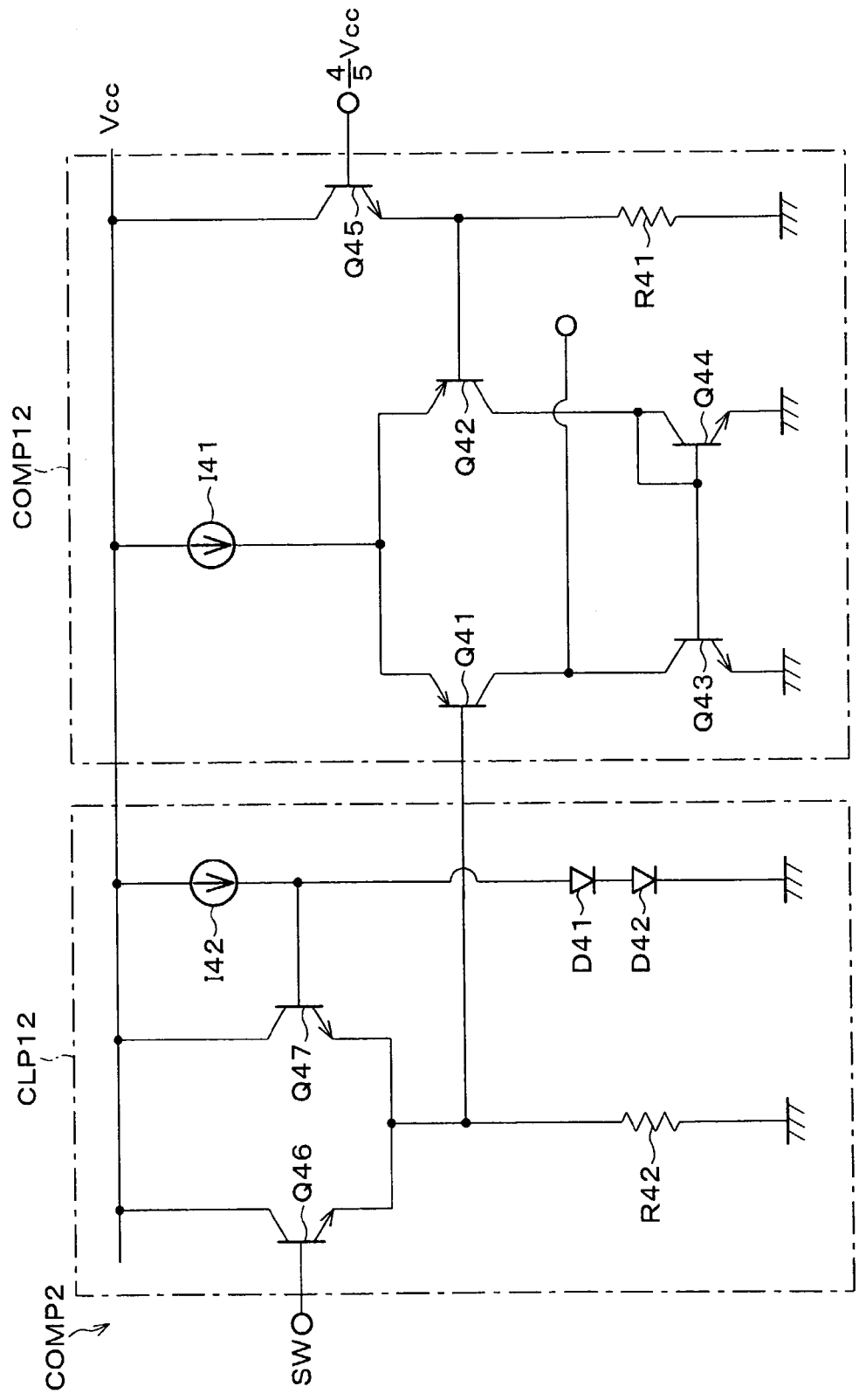
FIG. 6 is an electrical circuit diagram showing one example of a structure of another comparator in the switching circuit.

FIG. 6 is an electrical diagram showing one example of a structure of the comparator COMP2. The comparator COMP2 is similar to the comparator COMP1 and includes a comparator COMP12 and a clamping circuit CLP12, the comparator COMP12 being realized by transistors Q41 through Q45, a resistor R41, and a constant current supply I41, and the clamping circuit CLP12 being realized by transistors Q46 and Q47, diodes D41 and D42, a resistor R42, and a constant current supply I42.

In the comparator COMP2, the transistors Q46 and Q47 of the clamping circuit CLP12 have the opposite polarity to the transistors Q36 and Q37. The base voltage of the transistor Q41, which is the input of the comparator COMP12, is limited by the transistor Q47 below a voltage 1VBE (0.8 V), which is set by the transistor Q47 and the diodes D41 and D42. This prevents the comparator COMP12 from being saturated in response to a large voltage decrease of the switch control signal supplied to the base of the transistor Q46 that is paired with the transistor Q47, thereby suppressing adverse effects of saturation, such as malfunctions and/or deterioration of response characteristics.

By realizing the switching circuit 31 using the comparators COMP1 and COMP2 having the foregoing structures, the photo-detector amplifier circuit 20 can accurately switch gains in three values (modes) in response to fluctuation of the power voltage Vcc. In so doing, the photo-detector amplifier circuit 20 sets the switch control signal in a voltage range of not more than about 1VBE in the writing mode, not less than about 4·Vcc/5 in the low-reflective disk reproducing mode, and at about Vcc/2±1VBE in the high-reflective disk reproducing mode.

Another embodiment of the present invention is described below with reference to FIG. 7.

Figure 7:
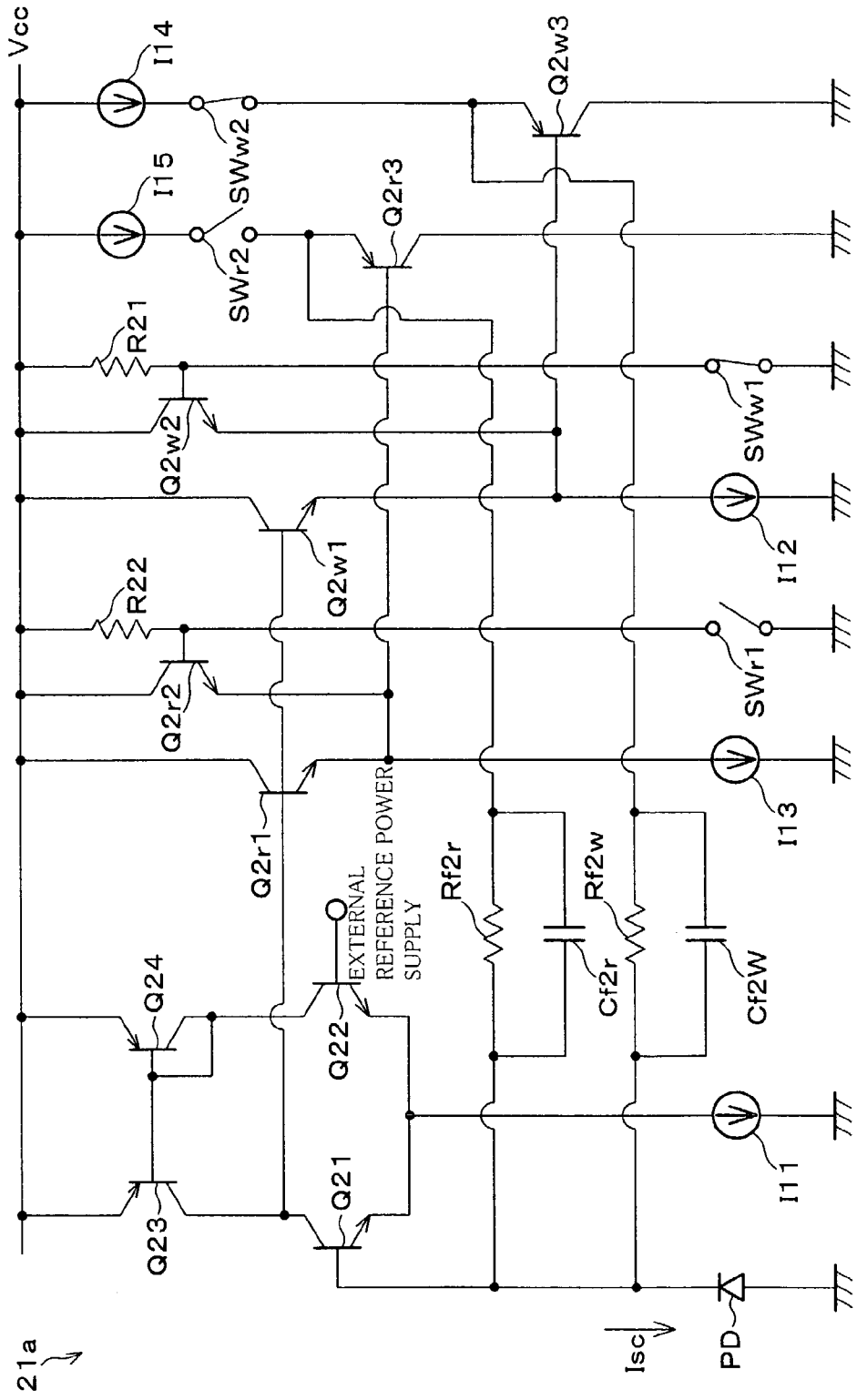
FIG. 7 is an electrical circuit diagram showing a first-stage amplifier in a photo-detector amplifier circuit of another embodiment of the present invention.

FIG. 7 is an electrical diagram showing a first-stage amplifier 21a in a photo-detector amplifier circuit according to another embodiment of the present invention. The first-stage amplifier 21a is a differential amplifier and includes a photodiode PD that is connected to the base of one of the transistors making up a differential pair, i.e., an N-type transistor Q21. To the base of the other transistor, i.e., an N-type transistor Q22, of the differential pair is externally supplied a reference voltage. A constant current supply I11 commonly draws a constant current from the emitters of the transistors Q21 and Q22. The collectors of the transistors Q21 and Q22 are connected to a high-level power supply via P-type transistors Q23 and Q24, respectively, that make up a current mirror circuit.

In the first-stage amplifier 21a that is provided as a differential amplifier, the emitters of transistors Q2w3 and Q2r3 make up output terminals to the second-stage amplifiers 22 and 23. The junction of the transistors Q21 and Q23 is commonly connected to the bases of the N-type transistors Q2w1 and Q2r1. The collectors of the transistors Q2w1 and Q2r1 are connected to a high-level power supply. Constant current supplies I12 and I13 draw constant currents from the emitters of the transistors Q2w1 and Q2r1, respectively. The emitters of the transistors Q2w1 and Q2r1 are also connected to a high-level power supply via N-type transistors Q2w2 and Q2r2, respectively. The bases of the transistors Q2w2 and Q2r2 are connected to a high-level power supply via bias resistors R21 and R22, respectively, and selectively grounded via switches SWw1 and SWr1, respectively.

The emitters of the transistors Q2w1 and Q2r1 are connected to the bases of P-type transistors Q2w3 and Q2r3. To the emitters of the transistors Q2w3 and Q2r3 are selectively supplied constant currents from constant current supplies I14 and I15 via switches SWw2 and SWr2, respectively. Between the emitters of the transistors Q2w3 and Q2r3 and the base of the transistor Q21 are connected a parallel circuit of a feedback resistor Rf1w and a feedback capacitor Cf1w and a parallel circuit of a feedback resistor Rf1r and a feedback capacitor Cf1r.

Thus, closing the switches SWw1 and SWw2 (state shown in FIG. 3) turns OFF the transistor Q2w2 and turns ON the transistors Q2w1 and Q2w3 by the currents from the constant current supplies I12 and I14. The transistors Q2w1 and Q2w3 in an ON state connect the parallel circuit of the feedback resistor Rf1w and the feedback capacitor Cf1w between the emitter of the transistor Q2w3, which makes up an output terminal of the first-stage amplifier 21a, and the base of the transistor Q21, which makes up an input terminal of the first-stage amplifier 21a, and thereby form a feedback loop for writing. Here, the switches SWr1 and SWr2 are OFF, the transistor Q2r2 is ON, the transistors Q2r1 and Q2r3 are OFF, and the parallel circuit of the feedback resistor Rf1r and the feedback capacitor Cf1r is open.

On the other hand, closing the switches SWr1 and SWr2 turns OFF the transistor Q2r2 and then turns ON the transistors Q2r1 and Q2r3 by the currents from the constant current supplies I13 and I15. The transistors Q2r1 and Q2r3 in an ON state connect the parallel circuit of the feedback resistor Rf1r and the feedback capacitor Cf1r between the emitter and base of the transistor Q2r3, and thereby forms a feedback loop for reproducing. Here, the switches SWw1 and SWw2 are OFF, the transistor Q2w2 is ON, the transistors Q2w1 and Q2w3 are OFF, and the parallel circuit of the feedback resistor Rf1w and the feedback capacitor Cf1w is open.

In this way, in writing and reproducing, only one pair of feedback loops is connected to the transistor Q11 that amplifies the current signal Isc, so as to eliminate influence of unnecessary elements. This realizes high-speed and wide-band operations.

With the first-stage amplifier 21, being a grounded amplifier as shown in FIG. 2, an amplifier with a wide dynamic range can be realized. On the other hand, the first-stage amplifier 21a, being a differential amplifier, does not require the dummy amplifier A12 and therefore requires much less constituting elements. The reason for this is explained below. In the first-stage amplifier 21 provided as a grounded amplifier, the photodiode PD is connected to the base of the transistor Q11. Consequently, the reference voltage is decided by the base-emitter voltage VBE of the transistor Q11. The output voltage Vo, with the switches SWw1 and SWw2 closed for example, is given by $$Vo=VBE(Q11)+Rf1w \times Isc+VBE(Q1w2)-VBE(Q1w1).$$

In an initial state where there is no optical signal, Isc=0. Assuming under this condition that VBE(Q1w1)=VBE(Q1w2), $$Vo=VBE(Q11).$$

The output voltage Vo of the first-stage amplifier 21 therefore fluctuates according to the bias voltage of the photodiode PD. It is for this reason that the first-stage amplifier 21 requires the dummy amplifier A12 that outputs its bias voltage as a reference for the second-stage differential amplifiers A21 and A22, which operate on externally supplied reference voltages.

Note that, the first-stage amplifiers 21 and 21a are suitably selected according to such factors as desired characteristics or chip size.

Still another embodiment of the present invention is described below with reference to FIG. 8.

Figure 8:
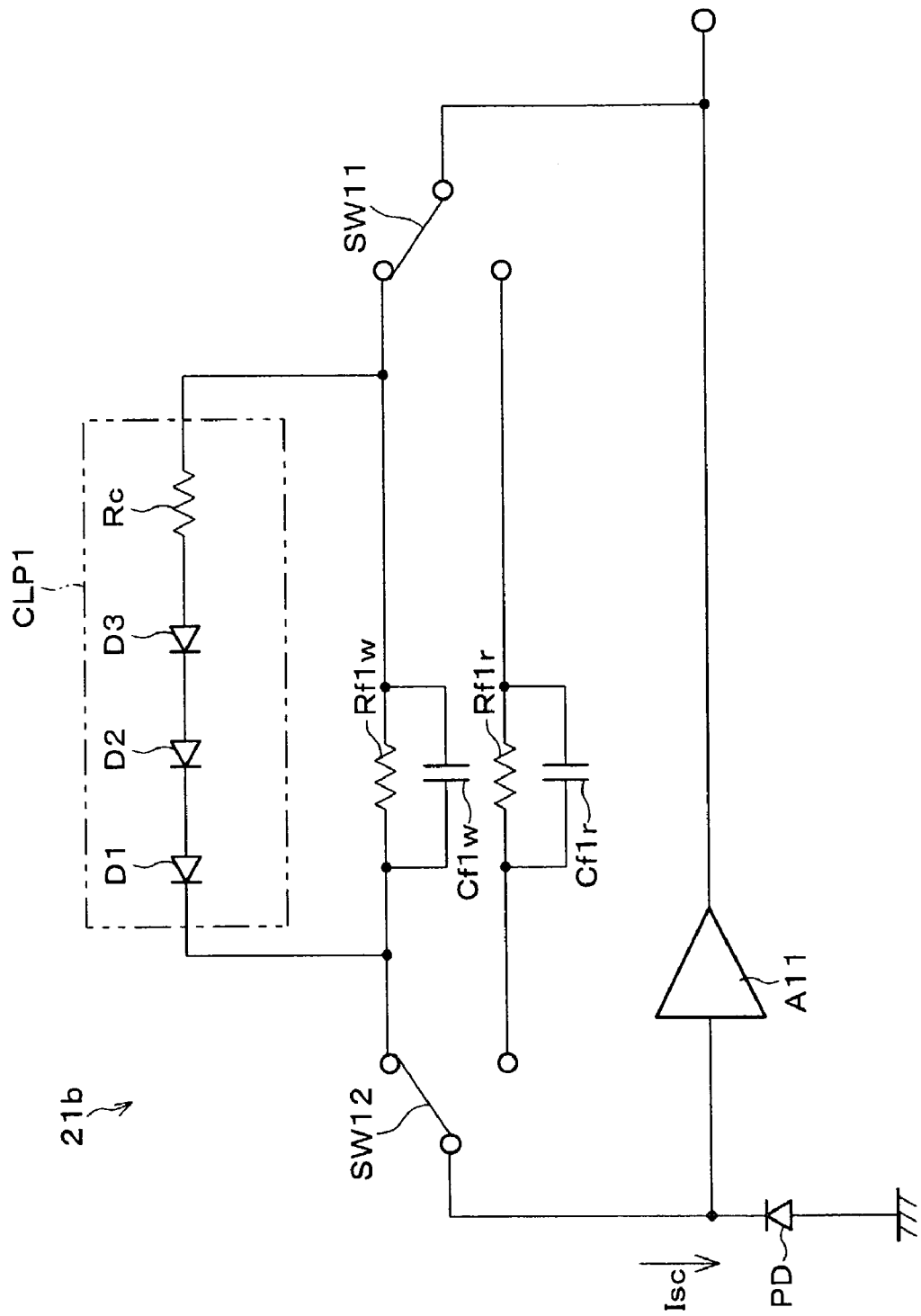
FIG. 8 is an electrical circuit diagram showing a first-stage amplifier in a photo-detector amplifier circuit of still another embodiment of the present invention.

FIG. 8 is an electrical diagram of a first-stage amplifier 21b in a photo-detector amplifier circuit according to still another embodiment of the present invention. The first-stage amplifier 21b may be either a grounded amplifier or a differential amplifier. Constituting elements of the first-stage amplifier 21b having similar and analogous arrangements to those in the first-stage amplifiers 21 and 21a are given the same reference numerals and explanations thereof are omitted here. What should be noted in the first-stage amplifier 21b is that it additionally includes a clamping circuit CLP1.

The clamping circuit CLP1 includes serially connected diodes D1 through D3, and a resistor Rc. The number of diodes is not just limited to three and any number of diodes can be suitably used according to a voltage to be clamped. The clamping circuit CLP1 is connected parallel to a parallel circuit of a feedback resistor Rf1w and a feedback capacitor Cf1w, which is selected when carrying out writing with a large laser power.

Thus, the diodes D1 through D3 become ON and the resistor Rc becomes connected parallel to the feedback resistor Rf1w when the current signal Isc after photo-electric conversion flows into the feedback resistor Rf1w and the voltage across terminals of the feedback resistor Rf1w (Rf1w×Isc) becomes larger than 3VBE. This reduces the equivalent gain resistance to the value of the parallel resistance of Rf1w and Rc, and the output voltage of the amplifier A11 is clamped with a voltage of at about 3VBE. This prevents the amplifier A11 from being saturated in response to large light input, thereby suppressing adverse effects of saturation of the amplifier A11, such as waveform distortion and deterioration of response characteristics.

Yet another embodiment of the present invention is described below with reference to FIG. 9.

Figure 9:
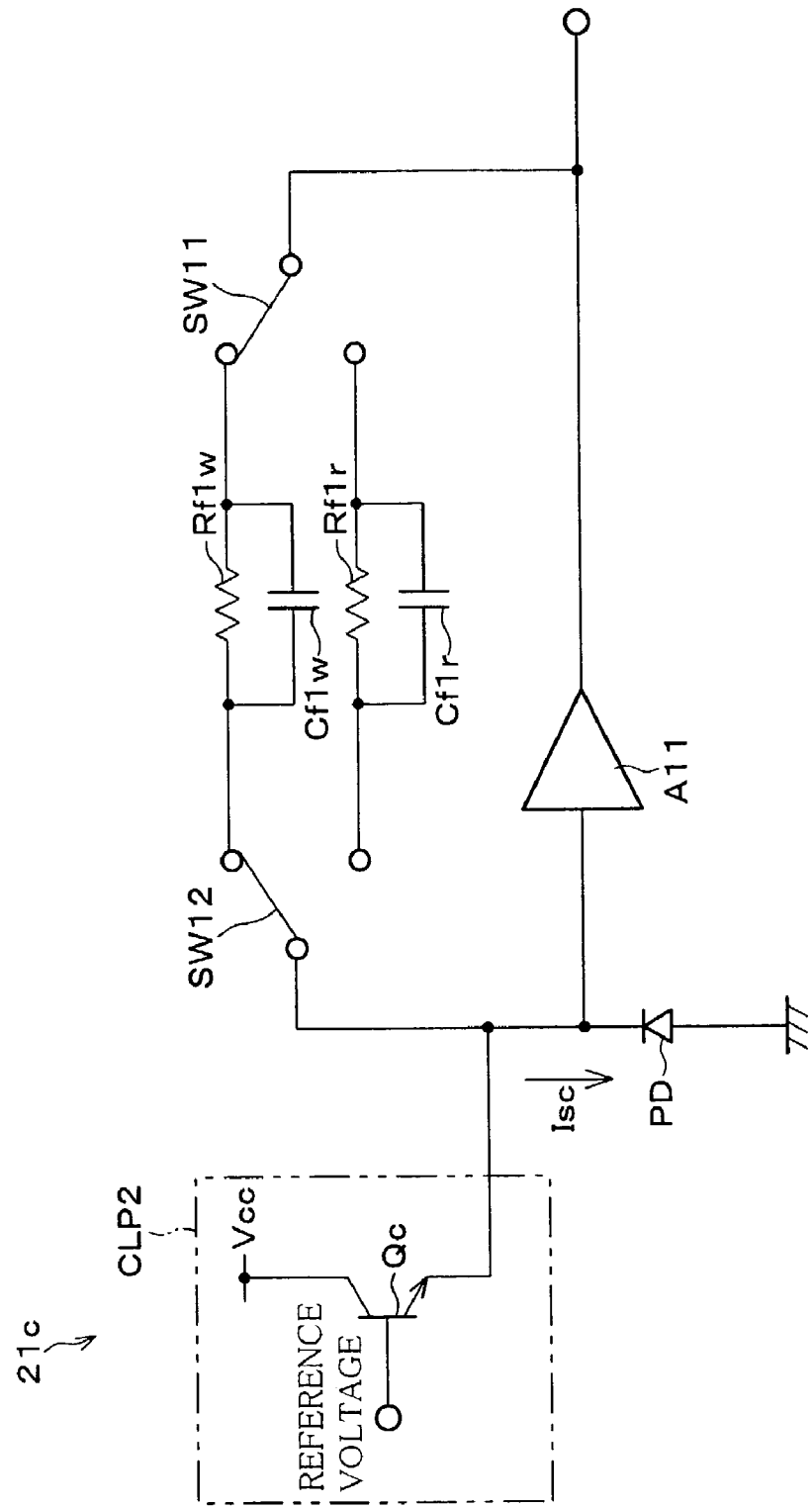
FIG. 9 is an electrical circuit diagram showing a first-stage amplifier in a photo-detector amplifier circuit of yet another embodiment of the present invention.
Figure 10:
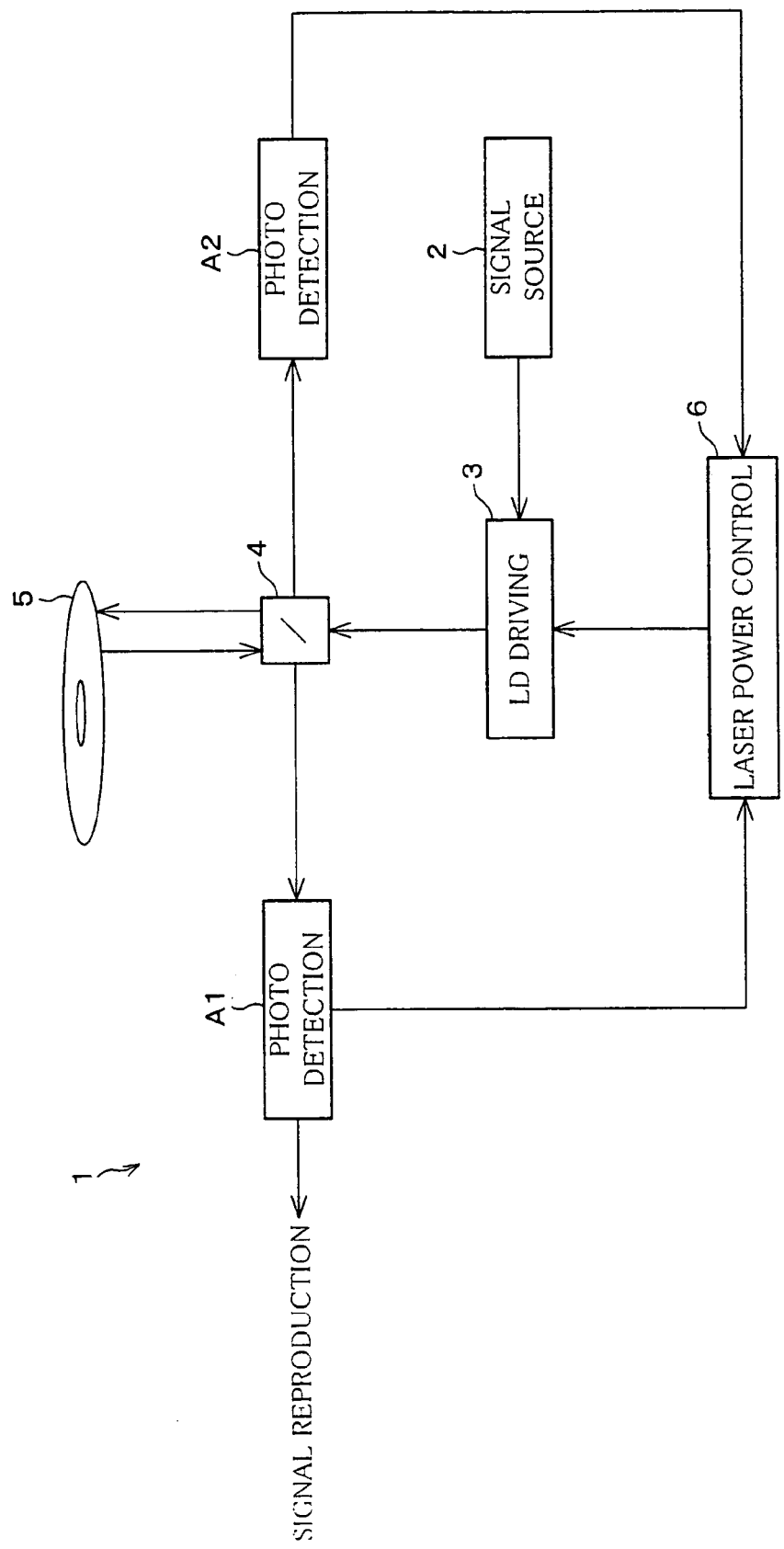
FIG. 10 is a block diagram showing an electrical structure of a common recording and reproducing device of an optical disk.
Figure 11:
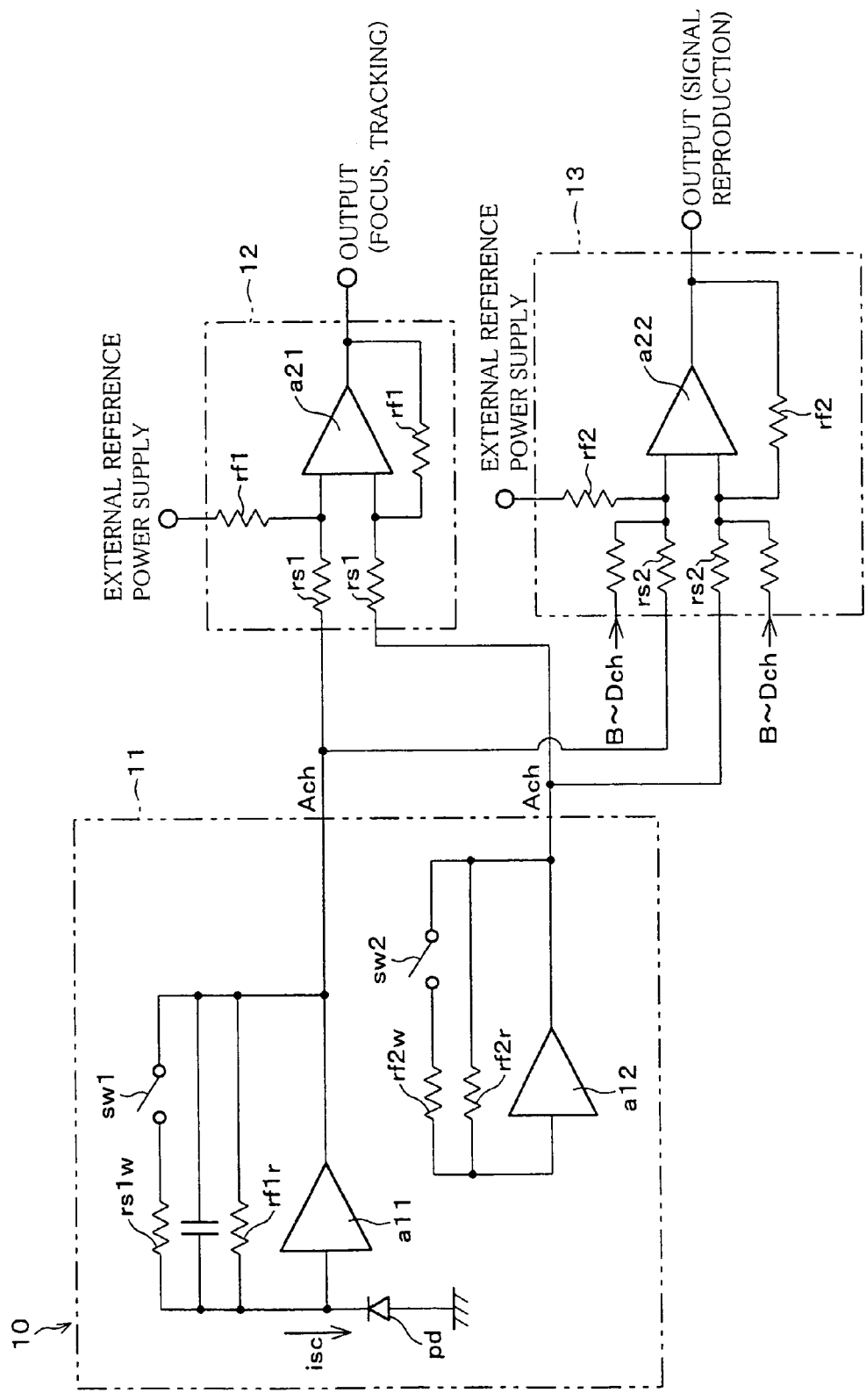
FIG. 11 is a block diagram showing an electrical structure of a photo-detector amplifier circuit of a typical conventional example.
Figure 12A:
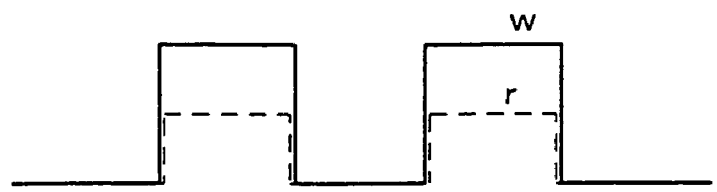
FIG. 12(a) through FIG. 12(d) are waveform diagrams explaining operations of the photo-detector amplifier circuit shown in FIG. 11.
Figure 12B:
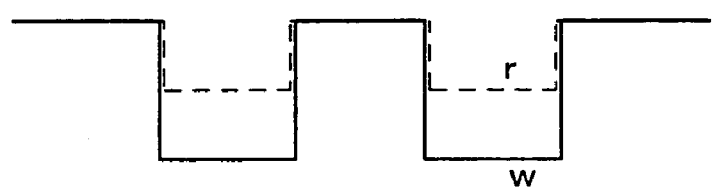
Figure 12C:
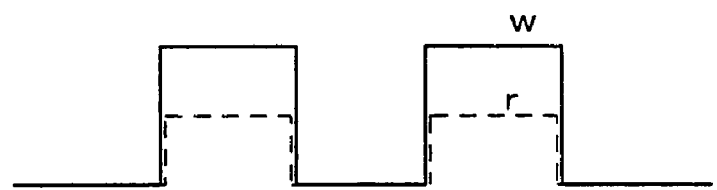
Figure 12D:
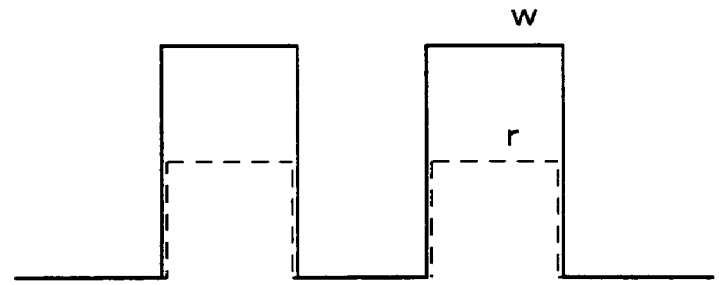

FIG. 9 is an electrical diagram of a first-stage amplifier 21c in a photo-detector amplifier circuit of yet another embodiment of the present invention. The first-stage amplifier 21c may be either a grounded amplifier or a differential amplifier. Constituting elements of the first-stage amplifier 21c corresponding to those in the first-stage amplifiers 21, 21a, and 21b are given the same reference numerals and explanations thereof are omitted here. What should be noted in the first-stage amplifier 21c is that it additionally includes a clamping circuit CLP2.

The clamping circuit CLP2 includes a reference voltage circuit and a transistor Qc. To the photodiode PD is applied a bias voltage that is created in the clamping circuit CLP2. The bias voltage is always higher than the difference of the reference voltage and the base-emitter voltage of the transistor Qc.

In this way, in response to large light input, the input voltage of the amplifier A11 is clamped to prevent the amplifier A11 from being saturated, so as to suppress waveform distortion and/or deterioration of response characteristics. The clamping circuit CLP2 can also suppress increase of parasitic capacitance of the photodiode PD, which occurs when the bias voltage of the photodiode PD lowers and when it occurs frequency characteristics are largely affected.

A photo-detector amplifier circuit for an optical disk device of the present invention includes a two-stage amplifier, which includes a first-stage amplifier and a second-stage amplifier, and the gain setting section includes: a first gain switching section, provided for the first-stage amplifier, for selecting the writing mode, the low-reflective disk reproducing mode, or the high-reflective disk reproducing mode; and a second gain switching section, provided for the second-stage amplifier, for selecting the low-reflective disk reproducing mode or the high-reflective disk reproducing mode.

According to this configuration with the two-stage amplifier, the first-stage amplifier and the first gain switching section, which are connected to the photo-detector element (photodiode), are used to accommodate the writing mode and the reproducing modes, whose laser powers differ by a factor of several tens of orders of magnitude, and the second-stage amplifier and the second gain switching section are used to accommodate the two reproducing modes.

That is, two feedback loops for switching gains are provided for the first-stage amplifier that has influence on frequency characteristics of the photo-detector element and these feedback loops are selectively used. The second-stage amplifier, whose influence on the frequency characteristics is relatively smaller, carries out two kinds of feedback operations. This more easily realizes high-speed and wide-band operations than providing three feedback loops for the first-stage amplifier, which is connected to the photodiode. Further, by using the output of the first-stage amplifier for focusing or tracking servo and the output of the second-stage amplifier for signal reproduction, a difference of disk reflectance of, for example, about two-fold but not as large as that between the writing mode and the reproducing modes can be accommodated with the second gain switching section.

In the photo-detector amplifier circuit for an optical disk device of the present invention, the first-stage amplifier is a grounded amplifier, and the first gain switching section includes two feedback loops that are connected to a photo-detector element, and the first gain switching section switches the feedback loops between the writing mode and the reproducing modes, so as to select a gain.

According to this configuration with the grounded amplifier, the first-stage amplifier with a wide dynamic range can be realized. Further, by switching gains by switching the two feedback loops themselves, the feedback loop corresponding to the other mode can be separated and unnecessary elements and parasitic capacitance in the feedback loop section can be eliminated. As a result, a photo-detector amplifier that is suitable for high-speed and wide-band operations can be realized.

Further, in the photo-detector amplifier circuit for an optical disk device of the present invention, one of the feedback loops corresponding to the writing mode is connected in parallel to a clamping circuit that includes a serially connected resistor and at least one diode.

According to this configuration, the provision of the clamping circuit that limits an output amplitude in the first-stage amplifier suppresses saturation of the first-stage amplifier in response to large light input and suppresses increase of parasitic capacitance of the photo-detector element. As a result, a high-speed and wide-band photo-detector amplifier circuit that can accommodate large light input can be realized.

Further, in the photo-detector amplifier circuit for an optical disk device according to the present invention, one of the feedback loops corresponding to the writing mode includes a clamping circuit with a clamping transistor whose collector is connected to a positive power supply, whose base is connected to a reference voltage, and whose emitter is connected to a junction of an input of the first-stage amplifier and the photo-receptor element.

According to this configuration, the provision of the clamping circuit that limits a voltage drop of the bias voltage of the photo-electric converting element in the first-stage amplifier suppresses saturation of the first-stage amplifier in response to large light input and suppresses increase of parasitic capacitance of the photo-detector element. As a result, a high-speed and wide-band photo-detector amplifier circuit that can accommodate large light input can be realized.

Further, in the photo-detector amplifier circuit for an optical disk device according to the present invention, the second-stage amplifier is a differential amplifier, and the second gain switching section includes a resistor and a transistor that are connected in parallel to a feedback resistor, and the second gain switching section operates the transistor by switching, so as to select a gain.

According to this structure, the gain switching section in the second-stage amplifier, which has relatively small influence on frequency characteristics of the photo-detector element, is realized by a simple structure of a parallel connection of a feedback resistor and a resistor, and a switch transistor. By selecting a feedback amount by the switching operation of the switch transistor, a photo-detector amplifier circuit with a reduced chip area and thereby reduced cost can be realized.

Further, the photo-detector amplifier circuit for an optical disk device of the present invention includes a switching circuit, provided with two comparators and a logic circuit, for switching switches that select the writing mode, the low-reflective disk reproducing mode, or the high-reflective disk reproducing mode.

According to this configuration, the output of the comparator is used to switch the two feedback loops for writing and reproducing in the first-stage amplifier, and the output of the logic circuit, such as an AND circuit, is used to switch the reproducing modes of a low-reflective disk and a high-reflective disk in the second-stage amplifier. In this way, only a single input terminal is required to switch gains in three values (modes), thereby suppressing increase of pin numbers in the photo-detector amplifier circuit and suppressing device cost.

Further, in the photo-detector amplifier circuit for an optical disk device of the present invention, the switching circuit has an input voltage substantially in a range of not more than 1VBE in the writing mode, not less than 4·Vcc/5 in the low-reflective disk reproducing mode, and at about Vcc/2±1VBE in the high-reflective disk reproducing mode.

According to this configuration, gains can be accurately switched in three values (modes) in accordance with fluctuations of the power voltage Vcc.

Further, in the photo-detector amplifier circuit for an optical disk device according to the present invention, the comparators respectively have input sections that are provided with clamping circuits for limiting an input voltage.

According to this configuration, the provision of the voltage limiting clamping circuit at the input section of the comparator prevents the comparator from being saturated in response to fluctuations of the input voltage and thereby prevents malfunctions. As a result, gains can be switched in three values (modes) with reduced degradation of response characteristics.

In the photo-detector amplifier circuit for an optical disk device of the present invention, the first-stage amplifier is a differential amplifier, and the first gain switching section includes two feedback loops that are connected to a photo-detector element, and the first gain switching section switching the feedback loops between the writing mode and the reproducing mode, so as to select a gain.

According to this configuration, in writing and reproducing, only one pair of feedback loops is connected to the transistor Q11 that amplifies the current signal Isc, so as to eliminate influence of unnecessary elements. As a result, high-speed and wide-band operations can be realized.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A photo-detector amplifier circuit for an optical disk device, comprising:
   a gain setting section for suitably setting an amplifier gain for each of a writing mode, a low-reflective disk reproducing mode, and a high-reflective disk reproducing mode;
   a two-stage amplifier, which includes a first-stage amplifier and a second-stage amplifier, said gain setting section including:
      a first gain switching section, provided for the first-stage amplifier, for selecting the writing mode, the low-reflective disk reproducing mode, or the high-reflective disk reproducing mode; and
      a second gain switching section, provided for the second-stage amplifier, for selecting the low-reflective disk reproducing mode or the high-reflective disk reproducing mode;
   wherein the first-stage amplifier is a grounded amplifier, and said first gain switching section includes two feedback loops that are connected to a photo-detector element, said first gain switching section switching the feedback loops between the writing mode and the reproducing modes, so as to select a gain; and
   wherein one of the feedback loops corresponding to the writing mode includes a clamping circuit with a clamping transistor whose collector is connected to a positive power supply, whose base is connected to a reference voltage, and whose emitter is connected to a junction of an input of the first-stage amplifier and the photoreceptor element.

2. A photo-detector amplifier circuit for an optical disk device, comprising:
   a gain setting section for suitably setting an amplifier gain for each of a writing mode, a low-reflective disk reproducing mode, and a high-reflective disk reproducing mode;
   a two-stage amplifier, which includes a first-stage amplifier and a second-stage amplifier; and
   a switching circuit, provided with two comparators and a logic circuit, for switching switches that select the writing mode, the low-reflective disk reproducing mode, or the high-reflective disk reproducing mode,
   said gain setting section including:
      a first gain switching section, provided for the first-stage amplifier, for selecting the writing mode, the low-reflective disk reproducing mode, or the high-reflective disk reproducing mode; and
      a second gain switching section, provided for the second-stage amplifier, for selecting the low-reflective disk reproducing mode or the high-reflective disk reproducing mode;
   wherein the first-stage amplifier is a grounded amplifier, and said first gain switching section includes two feedback loops that are connected to a photo-detector element, said first gain switching section switching the feedback loops between the writing mode and the reproducing modes, so as to select a gain.

3. The photo-detector amplifier circuit for an optical disk device as set forth in claim 2, wherein said switching circuit has an input voltage substantially in a range of not more than 1VBE in the writing mode, not less than 4·Vcc/5 in the low-reflective disk reproducing mode, and at about Vcc/2±1VBE in the high-reflective disk reproducing mode.

4. The photo-detector amplifier circuit for an optical disk device as set forth in claim 2, wherein the comparators respectively have input sections that are provided with clamping circuits for limiting an input voltage.

* * * * *